United States Patent [19]
Eash et al.

[11] 3,864,822
[45] Feb. 11, 1975

[54] APPARATUS AND A METHOD FOR FINAL ASSEMBLING OF DYNAMOELECTRIC MACHINES

[75] Inventors: Robert E. Eash; Robert C. Burkart, both of Fort Wayne, Ind.

[73] Assignee: Farlow Associates Inc., Fort Wayne, Ind.

[22] Filed: Apr. 29, 1974

[21] Appl. No.: 464,846

[52] U.S. Cl. ................. 29/598, 29/205 R, 310/42, 310/258
[51] Int. Cl. ......................................... H02k 15/02
[58] Field of Search ................. 29/598, 596, 205 R; 310/42, 90, 258; 144/32

[56] References Cited
UNITED STATES PATENTS

| | | | |
|---|---|---|---|
| 2,691,314 | 10/1954 | Stevens et al. | 144/32 X |
| 3,320,660 | 5/1967 | Otto | 29/596 |
| 3,538,598 | 11/1970 | Wightman et al. | 29/596 |

*Primary Examiner*—Carl E. Hall

[57] ABSTRACT

An apparatus and a method are provided for the final assembling of devices such as dynamoelectric machines. The method includes the steps of loosely assembling the dynamoelectric machine, securing the dynamoelectric machine into a rigid assembly by the tightening of tie-bolts, and spinning the shaft of the dynamoelectric machine while tightening the tie-bolts. The apparatus includes a base which carries a platen for the receiving of a dynamoelectric machine, a multiple nut-runner, air motor and a drive spindle being attached to the platen, and a clamping mechanism being attached to the base for clamping of the loosely assembled machine onto the platen and for holding the tie-bolts of the machine against rotation during the tightening of the nuts.

23 Claims, 12 Drawing Figures

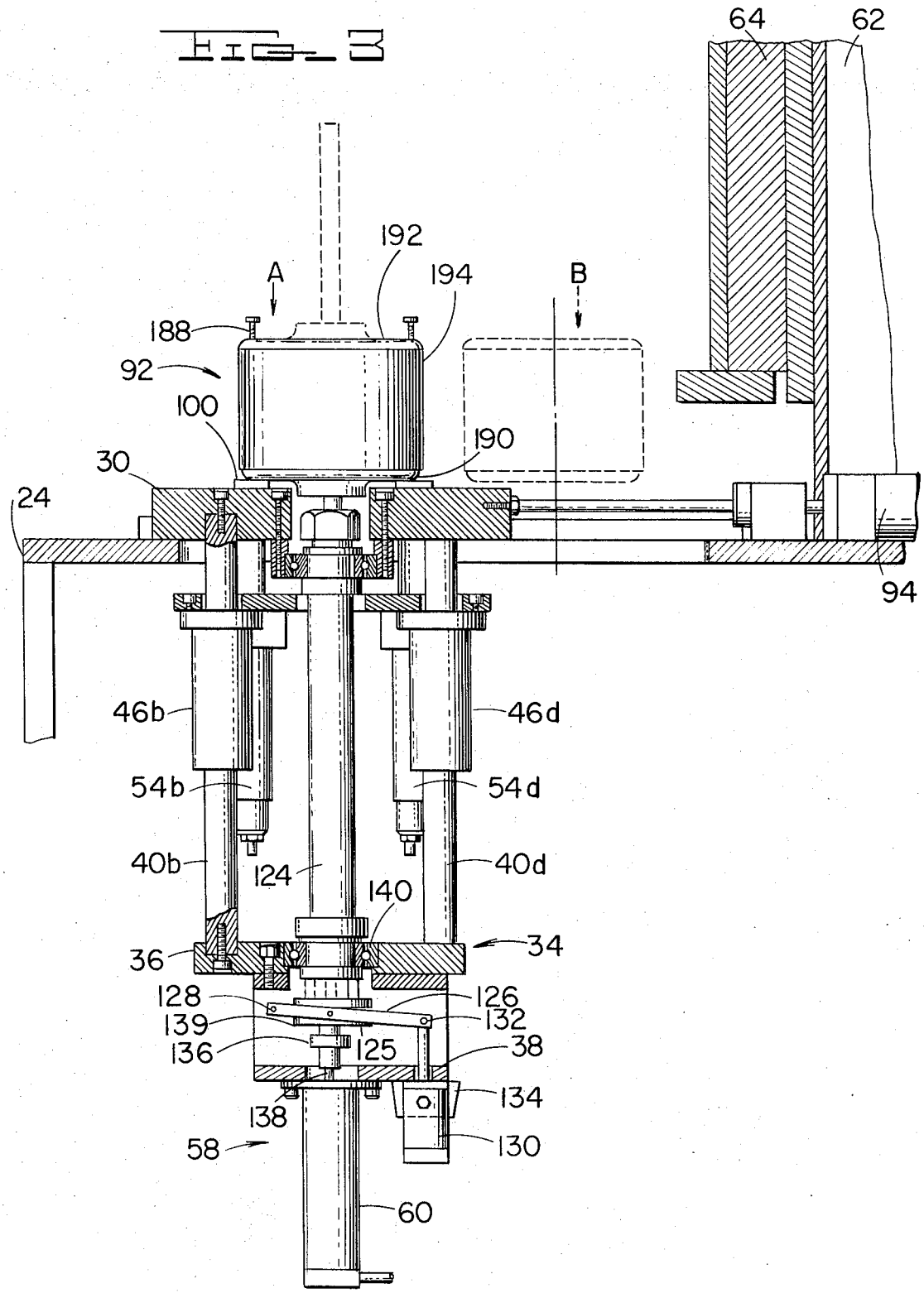

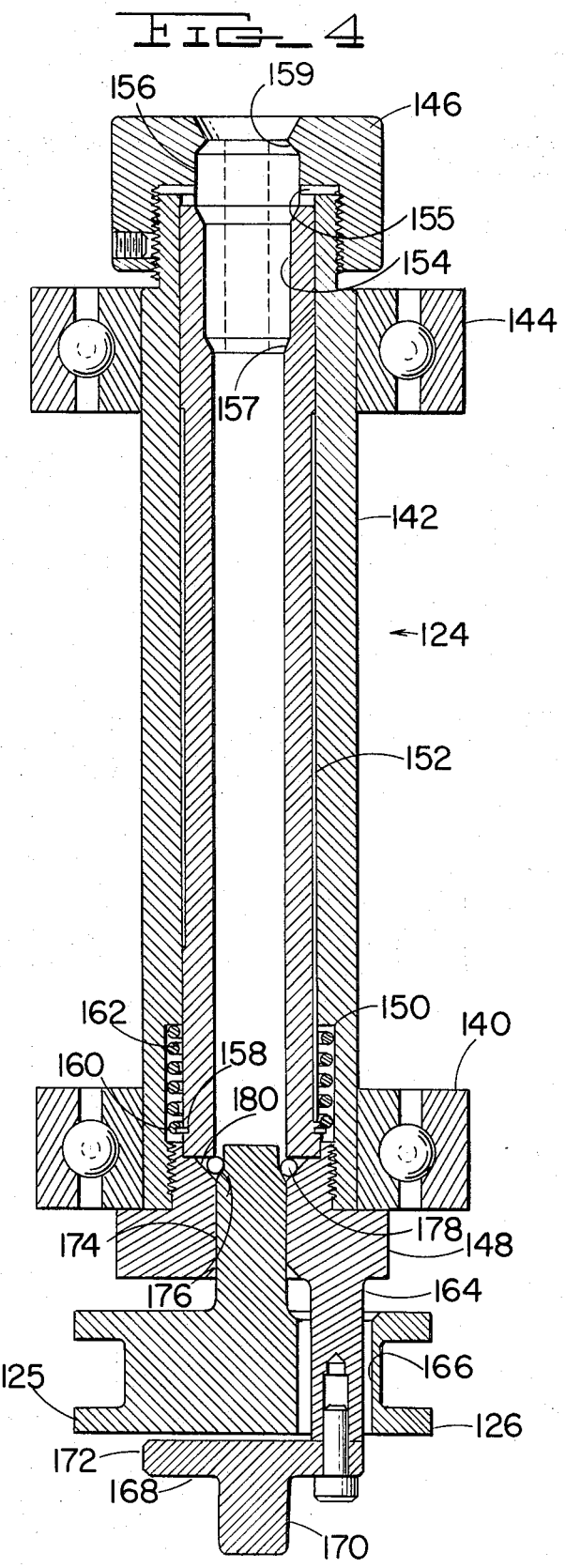
FIG_4

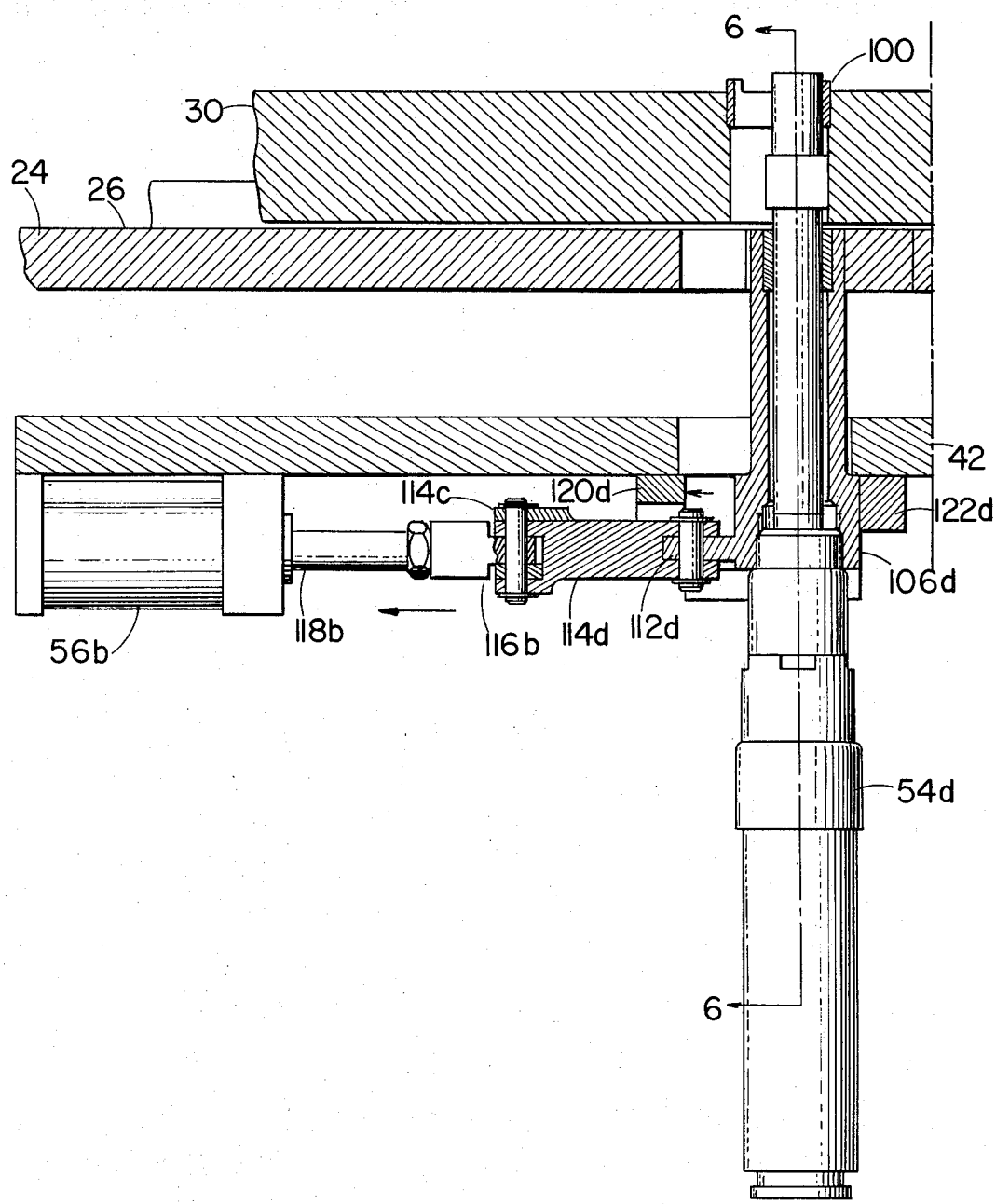

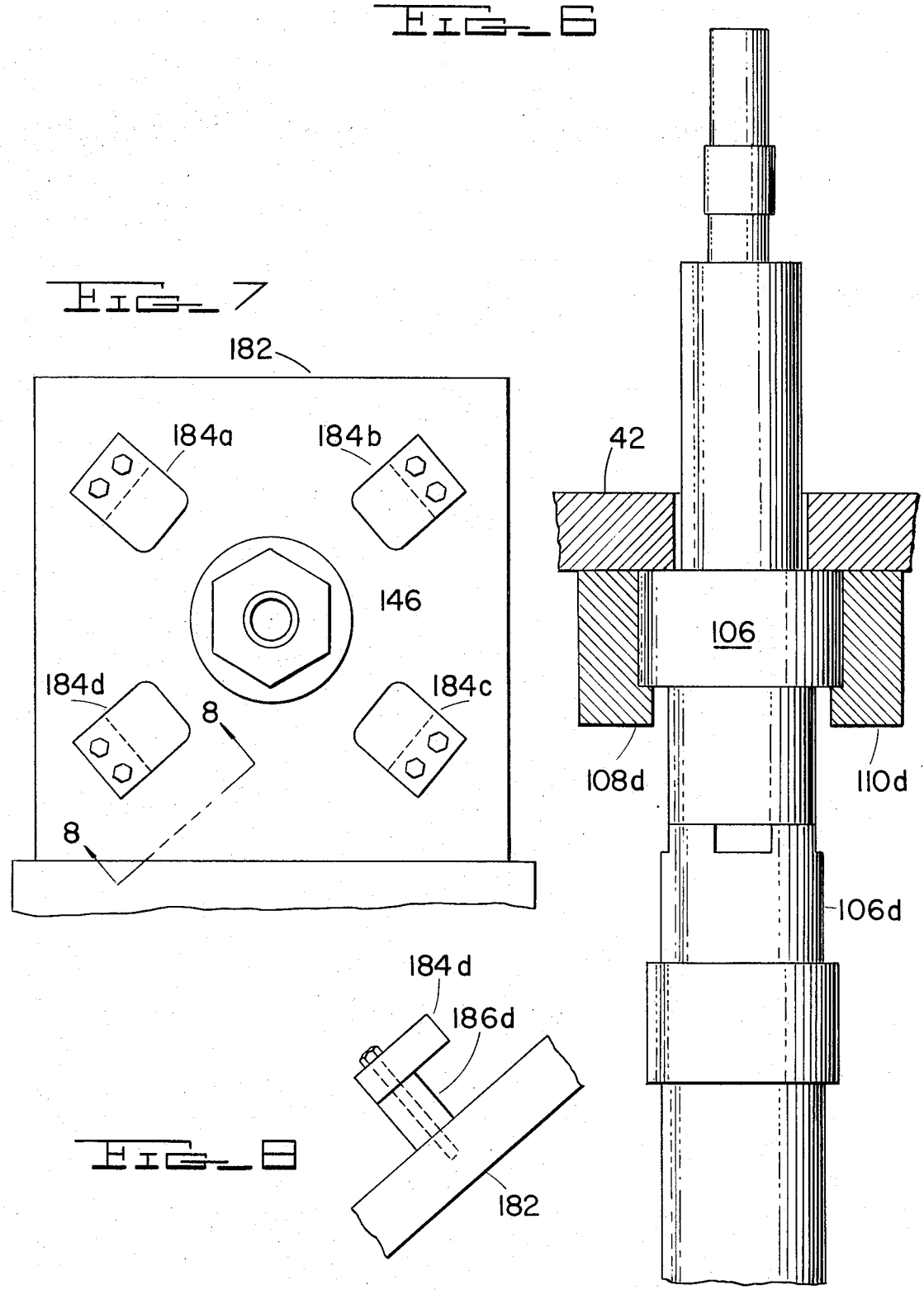

APPARATUS AND A METHOD FOR FINAL ASSEMBLING OF DYNAMOELECTRIC MACHINES

BACKGROUND OF THE INVENTION

1. Field of the Invention

This invention relates generally to a method and an apparatus for the final assembling of dynamoelectric machines into rigid assemblies, and more particularly to a method and an apparatus for tightening the tie-bolts of a dynamoelectric machine.

2. Description of the Prior Art

Machines of this type typically include a housing, a rotor rotatably disposed in the housing, and end plates closing the opposite ends of the housing. These end plates include bearings in which the rotor shafts are journalled. The entire assembly of parts is rigidly fixed into a final assembly by the insertion and tightening of tie-bolts which extend through the end plates. A problem in the past has been that small misalignment of the end plates has caused binding of the rotor shaft in the bearing surfaces of the end plates. This has greatly increased the assembly cost of dynamoelectric machines because of the cost of reworking of units with binding shafts. The method and apparatus of the present invention virtually eliminates rejects due to binding shafts by the spinning of the rotor and shaft assembly during the tightening of the tie-bolts.

SUMMARY OF THE INVENTION

In accordance with the broader aspects of this invention, there is provided an apparatus for the completing of the assembly of a machine, such as a dynamoelectric machine, having a plurality of relatively movable parts, into a secured relationship. A dynamoelectric machine assembly includes a housing having two substantially parallel end surfaces and an opening through the housing disposed transversely to the end surfaces. A rotor and shaft subassembly having first and second shafts is inserted into the opening of the housing; and first and second end plates which each include a bearing therein are assembled over the shafts of the rotor and are each assembled onto one of the end faces of the housing. Threaded fasteners which usually comprise tie-bolts and nuts, are loosely inserted through the end plates; and the end plates are rigidly clamped against the housing by the tightening of the nuts onto the tie-bolts.

The apparatus of the present invention includes a base having a supporting surface on the top thereof, a platen secured to the top of the supporting surface, a clamping mechanism being fastened to the base for holding the subassembled machine against the platen and for holding the tie-bolts against rotation, a plurality of nut-runners for driving the nuts onto the tie-bolts and for tightening the nuts to a predetermined torque, and a shaft-driving mechanism which includes an air motor and a drive spindle which is adapted to engage and to rotate the shaft of the rotor and shaft subassembly during the tightening of the tie-bolts.

In a preferred embodiment of the invention, the nut-runners are slidably mounted and are provided with air cylinders so that the apparatus is adaptable for tightening fasteners of dynamoelectric machines which have different fastener-location patterns; since it is common practice, in the electric motor industry, to provide extra bolt holes in the end plates of the electric motors; and these extra bolt holes are used to provide alternate tie-bolt location patterns. Differing tie-bolt patterns are provided for the convenience of appliance manufacturers who use these tie-bolts for the attaching of the electric motors to their appliances.

Also, the preferred configuration includes a second shaft-driving mechanism which is disposed above the dynamoelectric machine which is being assembled. Thus the apparatus is adaptable for use in assembling dynamoelectric machines which includes a drive shaft extending upward from the dynamoelectric machine as well as for use in assembling dynamoelectric machines which have a shaft depending downward from the machine.

In addition, in the preferred embodiment of this invention the platen is slide-mounted to the supporting surface of the base and is provided with an actuating cylinder which is effective to move the platen and the dynamoelectric machine from a loading station wherein the dynamoelectric machine is placed on the platen to a working station wherein the steps of spinning of the shaft and tightening of the fasteners are performed.

It is an object of this invention to provide a method of final assembling of a dynamoelectric machine, which method includes securing of the housing and end plates into a rigid assembly while simultaneously spinning the shafts of the rotor in the bearings.

It is another object of this invention to provide an apparatus for completing the assembly of a plurality of relatively movable parts into secured relationship.

It is still another object of this invention to provide an apparatus for the completion of the assembly of a dynamoelectric machine, the apparatus comprising means for supporting said assembly, mechanism for securing the threaded fasteners, and a shaft rotating means for spinning the rotor and shaft subassembly of the dynamoelectric machine during the securing of the threaded fasteners.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings:

FIG. 3 is a half-sectioned view taken substantially as shown by view lines 3—3 of FIG. 1 showing the lower shaft-driving mechanism;

FIG. 4 is a cross-sectioned view of the drive spindle which is used in both the lower shaft-driving mechanism and the upper shaft-driving mechanism;

FIG. 5 is a cross-sectioned side view of the mechanism for securing the threaded fasteners, taken substantially as shown by the view lines 5—5 of FIG. 2;

FIG. 6 is a cross-sectioned end view of FIG. 5, taken substantially as shown by view lines 6—6 of FIG. 5, illustrating the slidable mounting of the nut-runner mounting adapters;

FIG. 7 is a plan view of the clamping plate and the resilient clamping pads of the clamping and driving frame, taken substantially as shown by the view lines 7—7 of FIG. 1;

FIG. 8 is a side view taken substantially as shown by view lines 8—8 of FIG. 7, showing the mounting of resilient clamping pads onto the clamping plate of the clamping and driving frame;

DESCRIPTION OF THE PREFERRED EMBODIMENT

Figure 1:
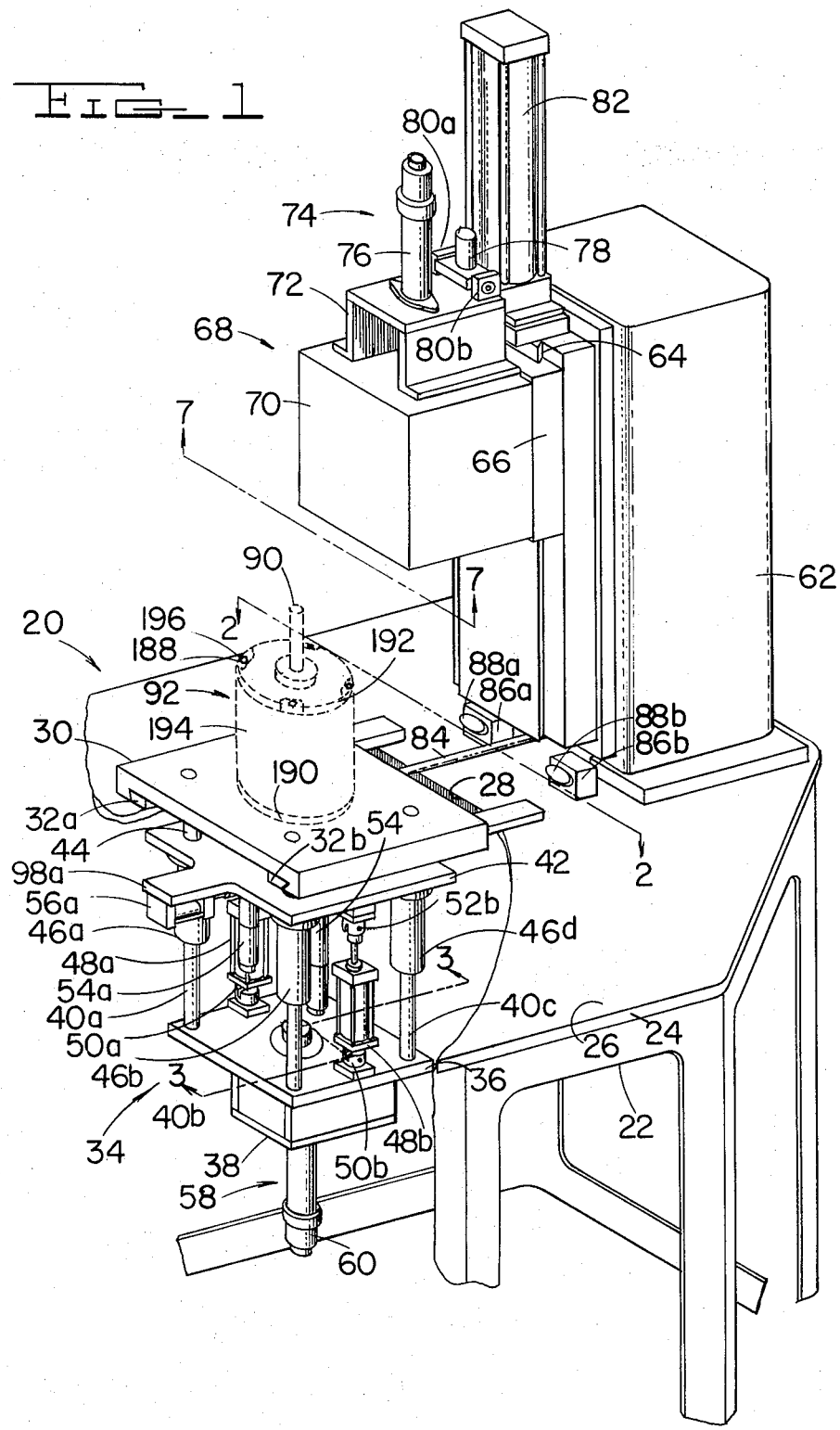
FIG. 1 is a perspective view of one apparatus of this invention showing the platen in the loading position and a dynamoelectric machine placed onto the platen.
Figure 11:
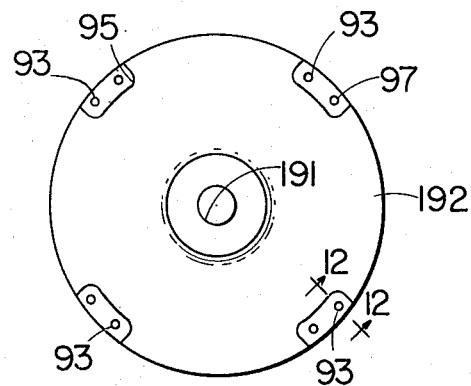
FIG. 11 is a top view of one end plate of a dynamoelectric machine assembled according to this invention.
Figure 12:
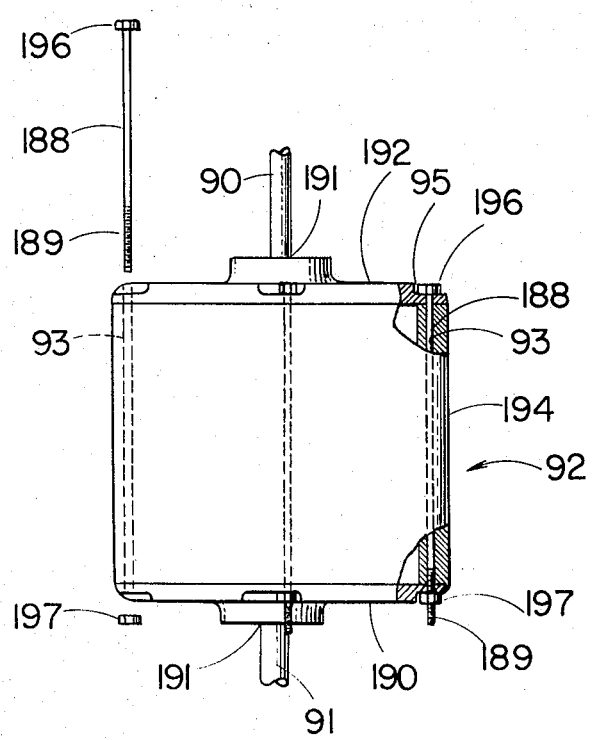
FIG. 12 is a side view, partially sectioned along section line 12—12 of FIG. 11 of the dynamoelectric machine showing one tie-bolt and nut assembly removed.

Referring to the drawings, and more particularly to FIGS. 11 and 12, a dynamoelectric machine 92 in the form of a conventional electric motor has a housing 194 provided with two rigidly secured end plates 190 and 192, respectively. The end plates 190, 192 each have coaxial bearings 191 which receive rotor shafts 90 and 91, respectively. Four tie-bolts 188 are received by four sets of aligned openings 93, circumferentially spaced as shown in FIG. 1 in the end plates and housing, respectively, to receive on the threaded distal ends 189 nuts 197. Tightening of the nuts 197 serves to secure the end plates and housing rigidly together.

As shown more clearly in FIG. 11, each end plate 190, 192 is recessed at 95 in the region surrounding the respective holes 93. Additional tie-bolt holes 97 in the recesses 95 in the end plates and housing are alternatively used to secure the assembly together as may be determined by design desiderata.

Referring to the drawings, and especially to FIG. 1, the apparatus of the present invention is generally indicated by the reference numeral 20. Apparatus 20 includes a base 22 having a base top 24 which includes a supporting surface 26 and a platen opening 28. A platen 30 is slidably mounted onto supporting surface 26 by slide or dovetail rails 32a and 32b which are secured to the base top 24 by bolts (not shown).

A lower frame 34 includes a lower frame plate 36 and a channel-like structure 38. The lower frame 34 is firmly attached to platen 30 by guide rods 40a, 40b, and 40c which are shown in FIG. 1 and by guide rod 40d which is shown in FIG. 3. Platen opening 28 is of sufficient size to provide an opening for all four of the guide rods 40 and to permit movement of guide rods 40 as platen 30 is moved on rails 32.

A feed plate 42 is provided with four rod holes 44 which are located to accept the guide rods 40. The feed plate 42 is secured to the top of four guide bushings 46 which slidably receive the guide rods 40. The feed plate 42 is raised and lowered by feed cylinders 48 having lower ends secured to the lower frame plate 36 by self-aligning mountings 50 and piston rods secured to the feed plate 42 by self-aligning mountings 52. Four nut-runners 54 are slidably attached to the feed plate 42 for actuation by a fastener-location shift cylinder 56a on the front which is shown in FIG. 1 and by a fastener-location shift cylinder 56b on the bach which is shown in FIG. 5. This slidable mounting of the nut-runners 54 is shown in FIG. 5 and will be discussed therewith.

The apparatus 20 of FIG. 1 also includes a lower shaft-driving mechanism 58 which includes air motor 60. The lower shaft-driving mechanism 58 is shown in detail in FIGS. 3 and 4 and will be described therewith.

The apparatus 20 includes a supporting column 62 which is securely mounted to the supporting surface 26 of base top 24. A dovetail 64 is mounted to the surface of the supporting column 62 which is proximal to the platen 30. A dovetail slide 66 is mounted to the dovetail 64 to provide vertically guided movement for a clamping and driving frame 68 which is rigidly attached to the dovetail slide 66 and which includes a box-type structure 70 and a channel-type structure 72.

The upper shaft-driving mechanism 74 is rigidly attached to the clamping and driving frame 68 and includes a second air motor 76. A collet-actuating cylinder 78 is trunnion-mounted to the channel-type structure 72 by trunnion legs 80a and 80b. A clamping cylinder 82 is mounted to the dovetail 64 and includes a piston rod (not shown) which is attached to the dovetail slide 66 for vertical actuation of the clamping and driving frame 68, by conventional mechanism not shown. The upper shaft-driving mechanism 74 functions identically to the lower shaft-driving mechanism 58 and can best be understood from FIGS. 3 and 4 and from the discussion thereof.

The platen 30 is moved from the loading position, as shown, to a working position by a piston rod 84; and the movement of the platen 30 is stopped at the working station by planar stop buttons 88a and 88b which are mounted to stop lugs 86a and 86b mounted to the supporting surface 26 adjacent to the platen 30. The planar stop buttons 88a and 88b serve to stop the movement of the platen 30 wherein a shaft 90 of a dynamoelectric machine 92 is accurately aligned with the upper shaft-driving mechanism 74.

Figure 2:
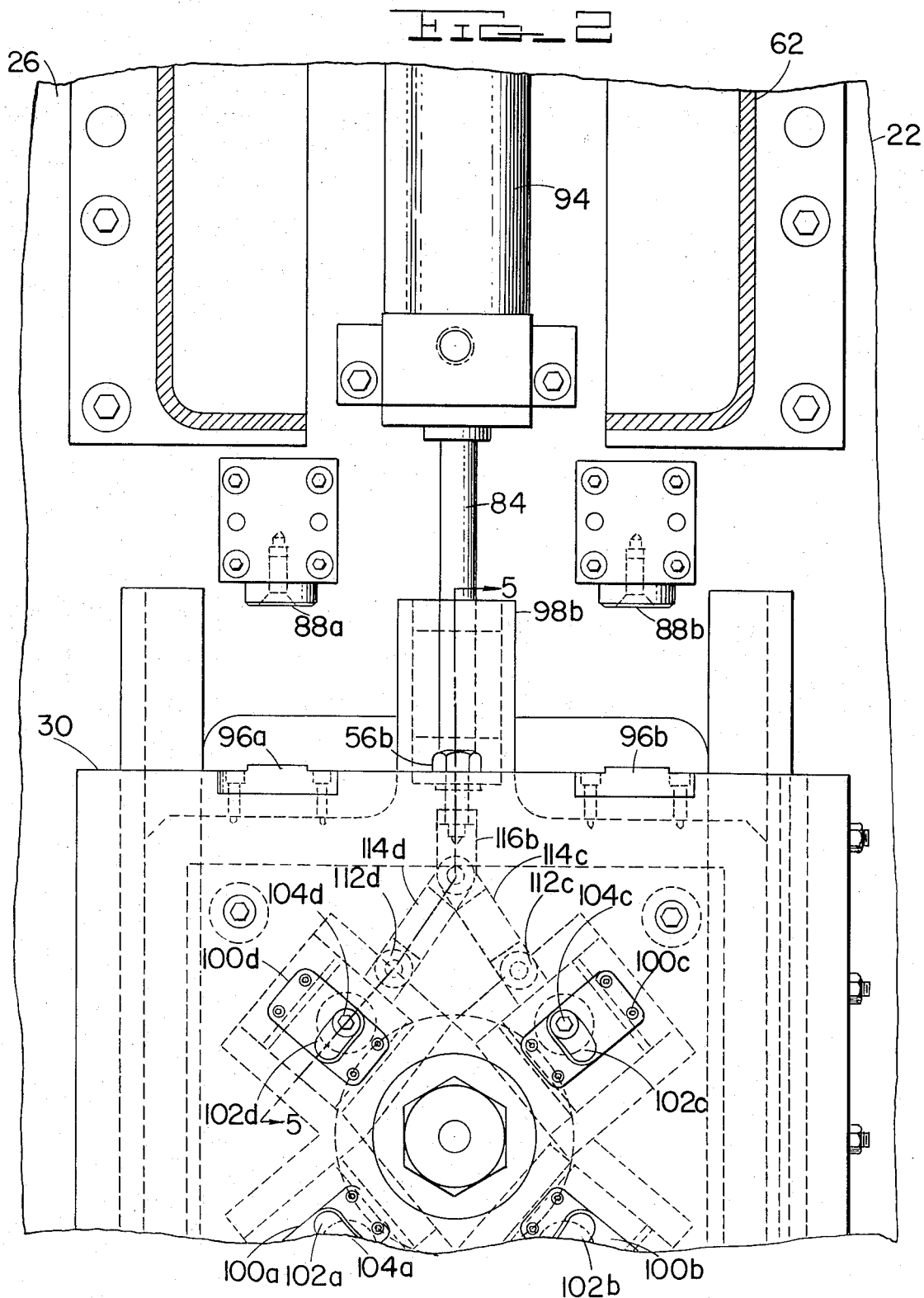
FIG. 2 is a partial top view of the apparatus, taken substantially as shown by the view lines 2—2 of FIG. 1, showing a portion of the platen and a portion of the supporting column in cross-section.

Referring now to FIG. 2, a portion of the supporting column 62 is shown in cross-section. Inside the supporting column 62, a platen-sliding cylinder 94 is attached to the supporting surface 26 of the base 22 and to the platen 30 for actuation of the platen 30 from the loading position to the working position wherein stop plates 96a and 96b abut the planar stop buttons 88a and 88b.

The feed plate 42 is mounted for vertical sliding motion on the guide rods 40 as has been previously described. The feed plate 42 includes mounting lugs 98a and 98b (FIGS. 1 and 2). The fastener-location shift cylinders 56a and 56b are mounted beneath mounting lugs 98a and 98b, shift cylinder 56b being shown in dashed lines below mounting lug 98b in FIG. 2, and shift cylinder 56a being shown in FIG. 1.

Referring again to FIG. 2, four nesting buttons 100 are mounted to the top surface of the platen 30, are generally disposed to correspond with the fastener-location pattern of the dynamoelectric machine 92, and are provided with raised portions that mate with correspondingly shaped recesses in the end plate 190 of machine 92 to provide radial and rotational indexing for machine 92. Nesting buttons 100 include drive-socket slots 102 which allow for the movement of drive sockets 104 to varying fastener-location patterns; e.g., between tie-bolt holes 93 and 97 of one recess 95 (FIG. 11).

Referring now primarily to FIGS. 2, 5 and 6, the four nut-runners 54 are circumferentially disposed as shown in FIG. 2 by the location of drive sockets 104 and nesting buttons 100. The nesting buttons 100 removably secured (by means of threaded fasteners) to platen 30 have raised portions that complement the respective recesses 95 in the end plate, e.g., 190 (FIGS. 11 and 3) for locating the end plate 190 on the platen 30. One of the nut-runners 54d and the mounting thereof is best shown in FIG. .5. In FIG. 5, the nut-runner 54d is mounted in a nut-runner mounting adapter 106d which is slidably mounted to the lower side of the feed plate 42. In FIG. 6, the slidable mounting of the adapter 106d to the bottom side of the feed plate 42 is by means of slide gibs 108d and 110d. Now referring to FIG. 5, it can be seen that the nut-runner mounting adapter 106d includes a tongue 112d which is connected to link 114d and that the link 114d is fastened to a connector 116d which attaches piston rod 118d of the fastener-location shift cylinder 56d to link 114d.

Referring now to FIGS. 2 and 5, it can be seen that the connector 116d is connected to links 114c and 114d and that links 114c and 114d are connected to tongues 112c and 112d. That is, each of the fastener-location shift cylinders 56a and 56d are connected to two links 114, and each link 114 is connected to one nut-runner mounting adapter 106. The extent to which the shift cylinder 56b can move the nut-runner 54d is limited by slide stops 120d and 122d which are fastened to the lower surface of the feed plate 42. Movement of the other nut-runners 54 is limited in like manner.

The positions of slide stops 120 and 122 are set to provide alignment of drive sockets 104 with the tie-bolt holes 93 and 97, respectively, (FIG. 11), the shift cylinders 56 being operable to position all sockets 104 in alignment with either one or the other set of such holes 93 and 97 as may be desired.

Referring now to FIG. 3, the lower shaft-driving mechanism 58 includes a drive spindle 124 having a collet-actuating bobbin 125 located on the lower end thereof, an actuating fork 126 being pivoted on said frame 38 at an end 128 and being connected to collet-actuating cylinder 130 at an end 132. Collet-actuating cylinder 130 is trunnion-mounted to the channel-like structure 38 of lower frame 34 by trunnion lugs 134. Lower shat-driving mechanism 58 also includes the air motor 60 and coupling 136 which connects a power shaft 138 of air motor 60 to a drive hub 139 of the drive spindle 124. The air motor 60 is attached to the bottom of the channel-like structure 38 and the drive spindle 124 is rotatably mounted in lower frame plate 36 by a ball bearing 140.

Referring now to FIG. 4, the construction and operation of the drive spindle 124 is ore clearly shown. The drive spindle 124 includes a drive tube 142 which is rotatably mounted to the lower frame plate 36 by the ball bearing 140 and to the platen 30 (not shown) by a ball bearing 144. The drive tube 142 includes an external thread on the upper end thereof which receives a collet nut 146 and an internal thread in the lower end thereof which receives a collet hub 148. The drive tube 142 also includes a spring recess 150. Inside drive tube 142 is slidably located a collet thrust tube 152. The thrust tube 152 is provided with a collet recess 154 and conical camming surfaces 155 and 157 which cooperate with a conical camming surface 159 of the collet nut 146 to impart clamping action to a collet 156. The collet thrust tube 152 also includes a retaining ring groove 158. A retaining ring 160 installed in groove 158 cooperates with a collet-release spring 162 to move the collet thrust tube 152 downward and to release the collet-actuating forces of the conical camming surface 155, 157, and 159 from the collet 156.

The collet hub 148 includes a plurality of hud fingers 164 which each extend through a plurality of holes 166 of the collet-actuating bobbin 125. A drive hub 168 includes a shaft portion 170 and a flanged portion 172 which is rigidly attached to the hub fingers 164. The collet-actuating bobbin 125 also includes a collet-actuating plunger 174. The collet-actuating plunger 174 includes a conical camming surface 176 which cooperates with balls 178 to move the collet thrust tube 152 upward. A chamber 180 in the collet hub 148 provides radial movement of the balls 178 as the camming surface 176 moves the balls 178 and the collet thrust tube 152 upward. This radial movement of the balls 178 allows the collet hub 148 to pass inside the balls 178 when the collet thrust tube 152 has been moved upward to actuate the collet 156. Thus it can be seen that the movement of the collet-actuating bobbin 125 upwardly serves both to actuate the shaft-engaging action of the collet 156 and also to provide a locking action for the collet 156; because the insertion of the collet-actuating plunger 174 inside the balls 178 is effective to lock the collet thrust tube 152 in an upward position.

Referring now to FIG. 7 which looks upward at the box-type structure 70, a clamping plate 182, which forms the bottom of the box-type structure 70, is provided with four resilient clamping pads 184 which are mounted to the clamping plate 182 by spacers 186 which are best seen in FIG. 8. The resilient clamping pads 184 are generally radially disposed about the collet nut 146 which coincides with the shaft location of the dynamoelectric machine 92 when the platen 30 is in the working location. The resilient clamping pads 184 are located so as to provide a clamping force to the heads of the tie-bolts of the dynamoelectric machine; and each of the pads 184 has sufficient width to provide the clamping force on the heads of the tie-bolts when apparatus 20 is used to assemble machines having different fastener-location patterns.

Referring now to FIG. 1, the clamping and driving frame 68 is fitted with the upper shaft-driving mechanism 74 of like construction as mechanism 58 which includes the second air motor 76 and the collet-actuating cylinder 78 and which functions the same as has been previously described for the lower shaft-driving mechanism 58; so a detailed description of the upper shaft driving mechanism 74 is not included.

Figure 9:
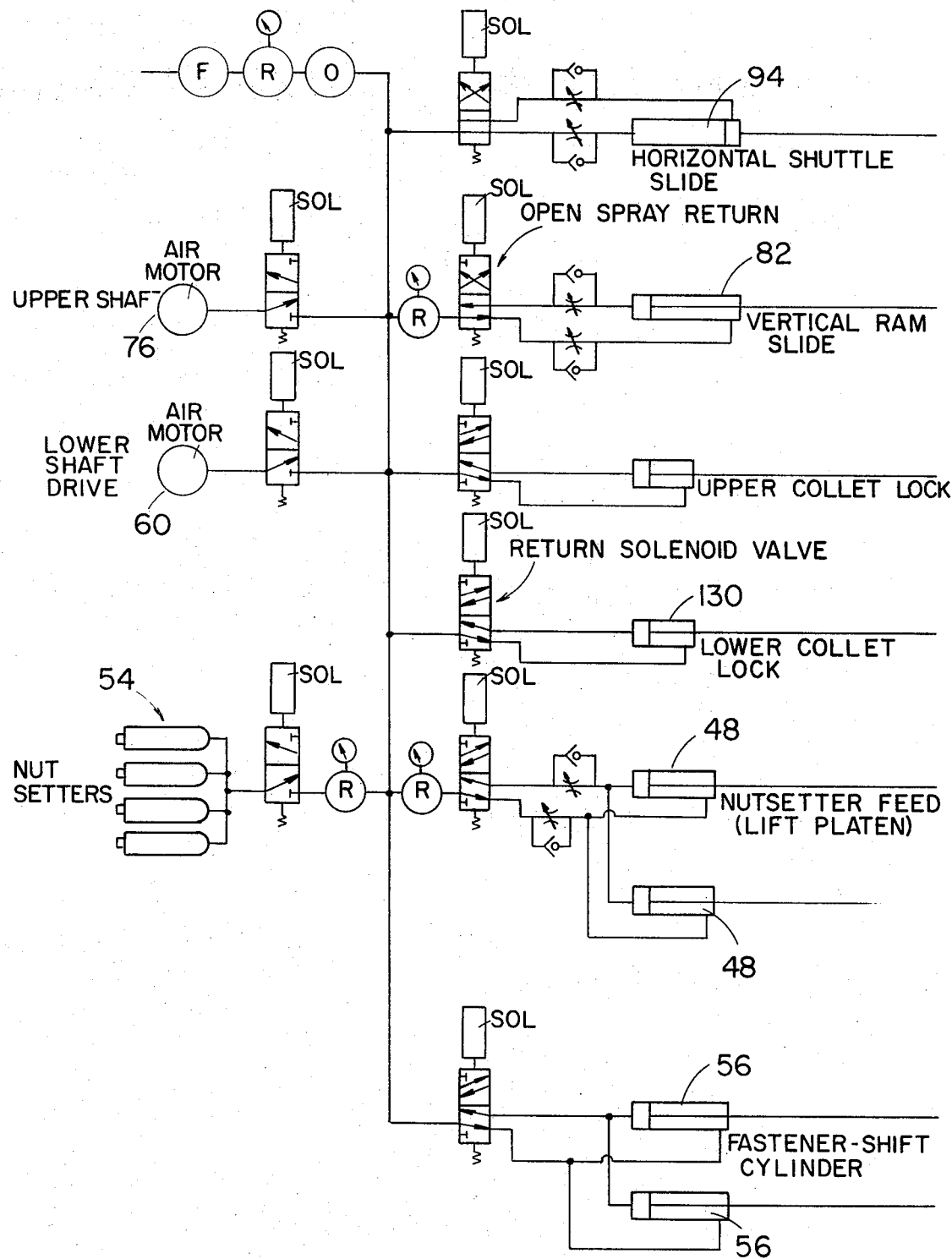
FIG. 9 is a pneumatic schematic of the apparatus.
Figure 10:
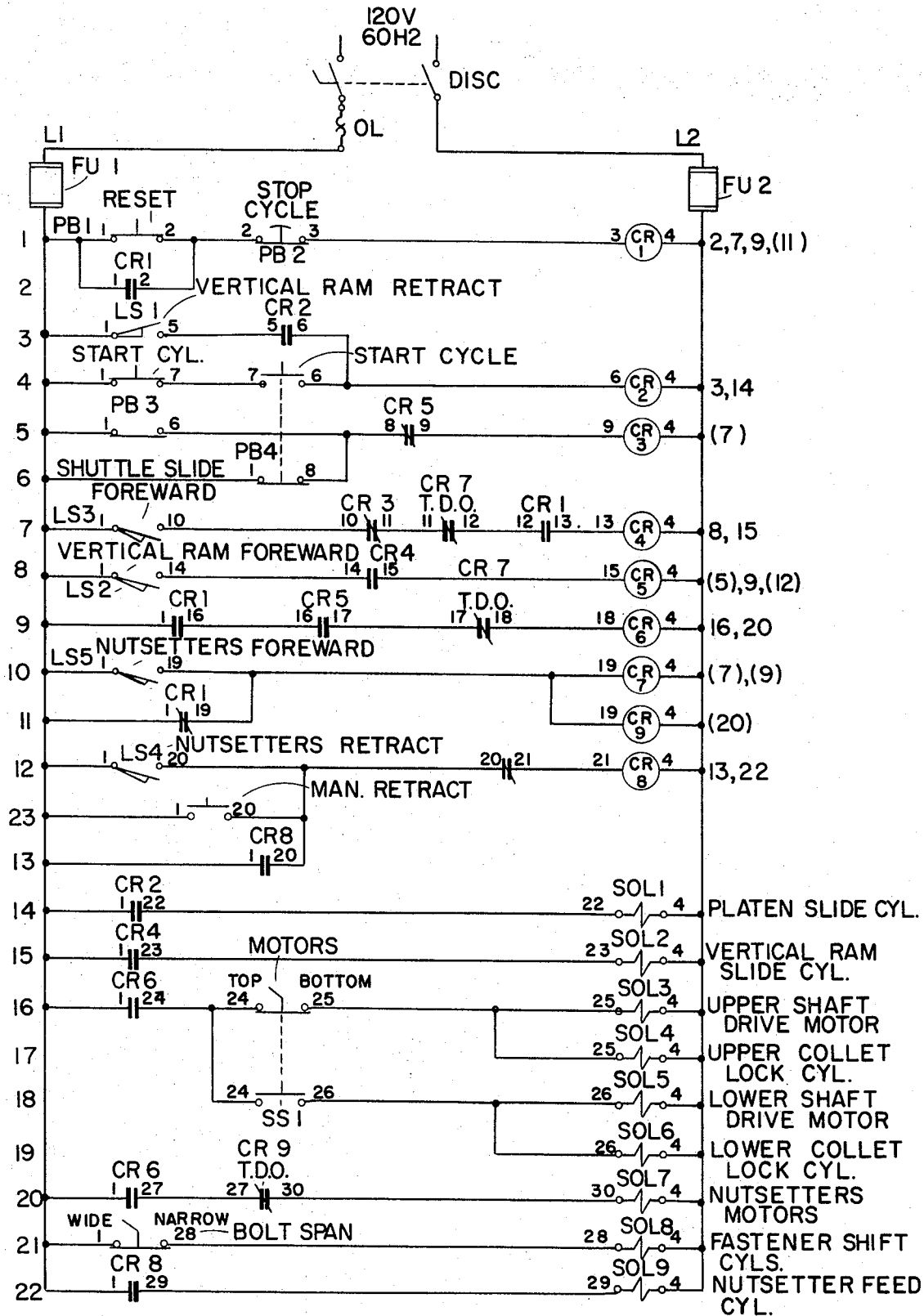
FIG. 10 is an electric schematic of the apparatus.

Referring now to FIG. 9 and 10, FIG. 9 is a schematic of the pneumatic control circuit, showing solenoid-actuated valves operating the various pneumatic cylinders. FIG.. 10 is an electrical schematic showing the control circuit which is used to actuate the solenoids of the solenoid valves shown in FIG. 9.

Referring now to the operation of apparatus and to the steps of the method, it was previously stated that the method comprises the spinning of the shaft of a loosely assembled dynamoelectric machine such as an electric motor, during the tightening of the tie-bolts which secure the end plates to the housing. The spinning of the rotor and shaft subassembly during the tightening of the tie-bolts has one objective, that is, the producing of an assembly in which the rotor and shaft subassembly turns freely after the tightening of the tie-bolts. Spinning of the rotor and shaft subassembly during tightening of the tie-bolts is effective to align the bearings and the end plates with the shafts of the rotor and shaft subassembly. Porous metal bearings, such as used in many of these machines, require the friction and heat of the rotating shaft to bring the lubricant from the bearing onto the shafts of the rotor and shaft subassembly.

Apparatus 20 is used to carry out the steps of the method as follows: referring now primarily to FIGS. 1, 3, 5, 11 and 12, fastener-location shift cylinders 56a and 56b are actuated to produce the desired fastener-location pattern to align socket 104 with the selected set of holes 93 or 97 (FIG. 11). Platen 30 is actuated to the loading position A, as shown in FIGS. 1 and 3, by the platen-sliding cylinder 94 which is best seen in FIGS. 2 and 3, if the platen 30 is not already in the working position B. The lower frame 34 and the nut-runners 54 are raised by the actuation of the feed cylinders 48 so that the drive sockets 104 protrude above platen 30 to receive nuts 197 (See FIG. 11) for the tie-bolts. The operator places nuts 197 into each of the drive sockets 104 and then actuates feed cylinders 48 to lower the feed plate 42 and to retract the drive sockets 104. The machine 92, which is loosely assembled, is then placed onto the platen 30 with tie-bolts in place; or machine 92 may be built up onto platen 30, starting with the placing of an end plate 190 of dynamoelectric machine 92 onto the nesting buttons 100 and platen 30. Either way, machine 92 is placed onto platen 30 with tie-bolts 188 extending through end plates 190 and 192 and housing 194. Thus the tie-bolts 188 are inserted through a selected set of holes 93, 97 (FIG. 11) of machine 92 with the heads 196 thereof resting against the end plate 192 and with threaded ends 189 extending beyond the end plate 190.

With the loosely assembled dynamoelectric machine 92 in place on the platen 30 and each tie-bolt having its threaded distal end in vertical alignment with the respective nut in its socket 104, the operator actuates platen-sliding cylinder 94, which is best seen in FIG. 2, to move the platen 30 against the stop buttons 88a and 88b wherein the platen 30 is in the working position B and wherein the dynamoelectric machine 92 is aligned with the upper shaft-driving mechanism 74.

The operator then actuates clamping cylinder 82 which is effective to lower the clamping and driving frame 68 downward until the resilient clamping pads 184 of soft pliable, plastic, such as polyurethane, engage the heads 196 of the tie-bolts 188, holding the heads 196 against the end plate 192. The pressure of the resilient pads against the heads 196, in addition to holding the tie-bolts 188 against rotation, is effective to hold end plate 192 against the housing 194, the housing 194 against the end plate 190, and the end plate 190 against the nesting buttons on platen 30.

With the dynamoelectric machine 92 on the platen 30 and the platen 30 in the working position B as described, the shaft 90 of the dynamoelectric machine 92 will vertically align with the collet (not shown) of the upper shaft-driving mechanism 74; and, if the dynamoelectric machine 92 includes a lower shaft (not shown), this shaft will have been inserted into the collet 156 of the lower shaft-driving mechanism 58. Operating cylinder 82 lowers drive frame 68 to fit the collet thereof over shaft 90. Thus the operator of apparatus 20 has the choice of engaging the collet of upper shaft-driving mechanism 74 with shaft 90 or of engaging the collet 156 of lower shaft-driving mechanism 58 with a lower shaft of dynamoelectric machine 92, or both. So the operator actuates collet-actuating cylinder 130 or collet-actuating cylinder 78, depending upon whether he wishes to engage the upper shaft 90 or a lower shaft of dynamoelectric machine 92.

After engaging a collet of one or both of the shaft-driving mechanisms 58 and 74 with a shaft of dynamoelectric machine 92, the operator actuates the electrical circuit to provide pressure air to the air motor 60 or to the second air motor 76, depending upon which of the shaft-driving mechanisms has been engaged with a shaft of the dynamoelectric machine 92. Then, with the shaft 90 of the dynamoelectric machine 92 spinning, the operator actuates the cylinders 48 raising the plate 42 and the nut-runners 54 which spin the nuts 197 previously placed in sockets 104 onto the threaded ends of tie-bolts 188 and which then provide the desired tightening torque to the nuts of the tie-bolts 188, such nut-runners 54 being of conventional torque-determining design.

The operator then completes the cycle by actuating the collet-actuating cylinder 130 or 78 to release the shaft-driving mechanisms 58 or 74 from the respective shaft. The operator actuates the clamping cylinder 82 to raise the clamping and driving frame 68 thereby releasing the clamping force from the tie-bolts 188 and moving upward the upper shaft-driving mechanism 74 to a position where it will clear the top of the shaft 90. The operator then actuates the platen-sliding cylinder 94 to move the platen 30 to the loading position A as shown in FIG. 1; and the operator removes the completely assembled dynamoelectric machine 92 from the platen 30.

While there have been described above the principles of this invention in connection with specific apparatus, it is to be clearly understood that this description is made only by way of example and not as a limitation to the scope of the invention.

We claim:

1. The method of finally assembling a dynamoelectric machine which includes a housing, a rotor rotatably disposed in the housing, and end plates closing the opposite ends of said housing, said end plates having bearings in which the rotor shafts are journalled, comprising the steps of:
   a. loosely assembling said housing, rotor, and end plates with said rotor shafts journalled in said bearings,
   b. securing said housing, rotor and end plates into rigid assembly while,
   c. simultaneously spinning said shafts in said bearings.

2. The method of claim 1 in which said securing step includes the tightening of threaded fasteners, said spinning step occurring during the tightening of said fasteners.

3. The method of claim 2 in which said end plates are provided with a plurality of aligned openings for receiving said threaded fasteners, said threaded fasteners including threaded tie-bolts having heads on one end and threads on the other end and nuts therefor, said securing step including inserting said tie-bolts into said aligned openings with the heads thereof engaging one end plate and the threads emerging from the other end plate, engaging said nuts with the respective threaded ends of said bolts, tightening said nuts on said threaded ends to a predetermined torque, the spinning of said shaft occurring during the tightening of said nuts.

4. The method of claim 3 in which the tightening of said nuts occurs simultaneously.

5. The method of claim 4 in which the end plates are assembled onto said housing with said rotor in place and the shafts fitting said bearings, positioning this assembly in a predetermined location, and inserting said tie-bolts into said aligned openings while the assembly is in said location.

6. The method of claim 5 in which said end plates, housing, rotor and tie-bolts are assembled on a supporting surface, clamping said assembly onto said supporting surface, holding said tie-bolts against rotation, and then performing the tightening of said nuts while said assembly is thus clamped and said tie-bolts held.

7. An apparatus for the completing of the assembly of a plurality of relatively movable parts into a secured relationship, which assembly includes a housing having two substantially parallel end faces and an opening through said housing disposed transversely to said end faces, a rotor and shaft subassembly having first and second shafts and being inserted into said opening, first and second end plates each having bearings therein for journalling of said shafts and each being assembled onto one of said faces and onto one of said shafts, and threaded fasteners loosely attaching said end plates to said housing, the apparatus which comprises:
  a. means for supporting said assembly;
  b. mechanism for securing said threaded fasteners; and
  c. shaft-rotating means for spinning said rotor and shaft subassembly during said securing of said threaded fasteners.

8. The apparatus of claim 7 in which said supporting means comprises a base having a supporting surface that includes an opening therethrough, and a perforated platen being mounted onto said supporting surface with the perforation of said platen registering with said opening.

9. The apparatus of claim 7 in which said securing mechanism comprises a multiple nut-runner attached to said supporting means.

10. The apparatus of claim 7 in which said shaft-rotating means comprises a motor, a drive spindle, and a coupling operatively attached to said supporting means.

11. The apparatus of claim 7 in which said supporting means comprises:
  a. a base having a supporting surface that includes an opening, and a perforated platen mounted onto said supporting surface of said base with the perforations of said platen registering with said opening;
  b. said securing mechanism comprises a multiple nut-runner operatively attached to said platen;
  c. said shaft-rotating means comprises a motor, a drive spindle, and a coupling operatively attached to said platen; and
  d. a clamping mechanism operatively attached to said base for clamping said assembly of parts to said platen.

12. The apparatus of claim 11 in which said apparatus includes a loading station wherein said assembly is placed onto said platen, and a working station spaced therefrom wherein said securing of said threaded fasteners is performed; said platen mounting comprising a slide mechanism operatively attached to said platen and to said supporting surface and providing for movement of said platen in a plane substantially parallel to said supporting surface between said loading and working stations.

13. The apparatus of claim 11 in which said supporting means includes a plurality of nesting buttons each being mounted onto said platen, and each having a slot therethrough which registers with said opening of said supporting surface and which receives one drive socket of said multiple nut-runner.

14. The apparatus of claim 11 in which said clamping mechanism comprises a plurality of resilient pads disposed in a plane which is parallel to said supporting surface and which is spaced from said supporting surface, said pads being angularly spaced to engage the head portions of a plurality of threaded fasteners.

15. The apparatus of claim 7 in which said apparatus includes a loading station wherein said assembly is loaded and a working station spaced therefrom wherein said securing of said fasteners is performed, said apparatus being adjustable for the securing of assemblies having different fastener-location patterns, and said fasteners including tie-bolts and nuts, the apparatus which further comprises:
  a. said assembly supporting means comprises a base having a horizontally disposed supporting surface on the top thereof and a transversely disposed platen opening therethrough, a horizontally disposed and perforated platen for receiving one of said end plates of said assembly with said shafts thereof vertically disposed, a horizontally disposed slide mechanism being attached to said mounting surface and to said platen and providing guided movement of said platen from said loading station to said working station, and four nesting buttons each being mounted to said platen to radially and rotationally align said end plate and each having a slot therethrough which registeres with one of said perforations;
  b. said securing mechanism comprises four vertically disposed guide rods having the upper ends thereof attached to said platen, a horizontally disposed lower frame being attached to the lower end of the guide rods, a guide bushing being slidably fitted over each of said guide rods, a horizontally disposed feed-plate being attached to the upper end of each of said guide bushings and having vertically disposed holes therethrough spaced to correspond generally to said fastener-location patterns, four nut-runner mounting adaptors each being slidably mounted to the lower surface of said feed plate and all cooperating to provide mounting sockets for four nut-runners and to provide guided movement of said nut-runners from one of said fastener-location patterns to another fastener-location pattern, four nut-runners each being mounted into one of said mounting sockets and each being vertically disposed with a drive socket thereof extending upwardly toward said platen, and first and second feed cylinders each being mounted to said lower frame at equally spaced distances from a pair of said supporting rods and each having a vertically disposed piston rod being attached to the lower surface of said feed plate;

c. said shaft-rotating means comprises a lower shaft-driving mechanism which includes an air motor having a vertically disposed power shaft and being mounted to the bottom side of said lower frame with said power shaft aligned with the shaft location of said assembly, a vertically disposed drive spindle having both a collet in the upper end thereof and a vertically slidable collet-actuating bobbin on the lower end thereof and being rotatably mounted to said lower frame and to said platen in alignment with said power shaft, a coupling drivably connecting said drive spindle to said power shaft, a horizontally disposed actuating fork having one end thereof pivotally connected to said lower frame and engaging said actuating sleeve intermediate the ends of said actuating fork, a collet-actuating cylinder being trunnion-mounted to said lower frame with the piston rod thereof extending upwardly and with said piston rod pivotally attached to the other end of said actuating fork;

d. an assembly clamping mechanism which comprises a vertically disposed supporting column being attached to said base, a vertically disposed dovetail being attached to said column adjacent to said platen, a dovetail slide being slidably mounted to said dovetail a clamping and driving frame being attached to said dovetail slide and including a horizontally disposed clamping plate on the bottom thereof, a plurality of resilient clamping pads being attached to the lower surface of said clamping plate and being disposed to engage the heads of said tie-bolts, a vertically disposed clamping cylinder being attached to the top of said dovetail and having a piston rod extending downwardly therefrom and connected to said dovetail slide;

e. an upper shaft-driving mechanism which includes a second air motor being mounted to the upper surface of said clamping and driving frame and having a vertically disposed power shafts depending therefrom with said power shaft aligned with the shaft location of said assembly, a second vertically disposed drive spindle having both a collet in the lower end thereof and a vertically slidable collet-actuating bobbin on the upper end thereof and being rotatably mounted to said clamping and driving frame in alignment with second said power shaft, a second coupling drivably connecting second said drive spindle to second said power shaft, a second horizontally disposed actuating fork having a first end pivotally connected to said clamping and driving frame and engaging said second actuating bobbin intermediate the ends of said second actuating fork, a second collet-actuating cylinder being trunnion-mounted to said clamping and driving frame and having a piston rod extending downwardly and pivotally connected to the other end of second said actuating fork;

f. a platen-sliding cylinder being horizontally mounted to said supporting surface in parallel alignment with said horizontal slide and having the piston rod thereof connected to said platen;

g. a platen stop mechanism comprising first and second vertically disposed and horizontally spaced stop plates being attached to said platen adjacent to said column and normal to said horizontally disposed slide mechanism, first and second stop lugs being attached to said supporting surface between said column and said platen and having vertically disposed and horizontally spaced button-mounting surfaces registering with said stop plates, and first and second planar stop buttons being attached to said button-mounting surfaces;

h. first and second fastener-location shift cylinders being horizontally mounted to opposite lower sides of said feed plate with the piston rods thereof extending inwardly toward the shaft location of said assembly, first and second links each having one end thereof pivotally connected to the piston rod of one of said shift cylinders and each having the other end thereof pivotally connected to one of said nut-runner adapters proximal to said first and second links, third and fourth links each having one end thereof pivotally connected to the piston rod of the other of said shift cylinders and each having the other end thereof pivotally connected to one of said nut-runner slides proximal to said third and fourth links;

i. a first solenoid-actuated air valve being connected to said platen-sliding cylinder, a second solenoid-actuated air valve being connected to said clamping cylinder, a third solenoid-actuated air valve being connected to said feed cylinders, a fourth solenoid-actuated air valve being connected to said fastener-location shift cylinders, a fifth solenoid-actuated air valve being connected to first said collet-actuating cylinder, a sixth solenoid-actuated air valve being connected to said second collet-actuating cylinder, and an electrical circuit being connected to said solenoid-actuated air valves and including manually actuated push buttons for cycling said apparatus.

16. An apparatus for completing the assembly of a plurality of relatively movable parts into secured relationship, which assembly includes a housing having two substantially parallel end faces and an opening through said housing disposed transversely to said end faces, a rotor and shaft subassembly having first and second shafts and being inserted into said opening, first and second end plates each having bearings therein for journalling of said shafts and each being assembled onto one of said faces and onto one of said shafts, and threaded fasteners loosely attaching said end plates to said housing, the apparatus which comprises:

a. a supporting frame, platen means on said frame for locating said assembly in a predetermined position, rotary drive means carried by said supporting frame in operative relation to said platen means adapted selectively to engage and spin a shaft of said assembly, nut-runner means carried by said supporting frame in operative relation to said platen means adapted selectively to engage and secure the threaded fasteners of said assembly, and means for actuating both said rotary drive means and said nut-runner means simultaneously.

17. The apparatus of claim 16 wherein said nut-runner means includes a feed plate mounted on said frame for movement selectively toward and away from said platen means, said rotary drive means including a motor and collet mounted on said support frame, said nut-runner means including at least one nut-runner mounted on said feed plate for movement therewith, said nut-runner having a fastener-engaging element adjacent to said platen means for engaging a threaded fastener of said assembly.

18. The apparatus of claim 17 in which said platen means includes a horizontally disposed plate having an opening for receiving a shaft of said assembly therethrough, a plurality of access openings in said platen plate arranged in a predetermined pattern about said shaft opening, said access openings being aligned with the fastener-engaging elements of a plurality of said nut-runners mounted on said feed plate, said feed plate extending horizontally and being movable to insert said fastener-engaging elements selectively through the respective access openings.

19. The apparatus of claim 18 in which said feed plate is mounted for vertical movement on a plurality of spaced upright guide rods operatively mounted on said supporting frame, and a hydraulic cylinder device operatively connected between said feed plate and said supporting frame for moving said feed plate vertically.

20. The apparatus of claim 19 wherein the plate of said platen means is mounted for reciprocal horizontal movement on said supporting frame between first and second predetermined positions, said guide rods being rigidly suspended from said platen plate and said feed plate being disposed in spaced relation therebelow.

21. The apparatus of claim 20 including a clamping mechanism carried by said supporting frame for vertical movement toward and away from and in registry with the second position of said platen plate, said clamping mechanism including fastener-engaging elements for engaging threaded fasteners of said assembly.

22. The apparatus of claim 21 wherein said clamping mechanism includes a rotary drive motor and vertically aligned collet adapted to receive and engage selectively an upstanding shaft of said assembly when said platen plate is in said second position.

23. The apparatus of claim 22 in which said fastener-engaging elements of said clamping mechanism are vertically aligned with the fastener-engaging elements of said nut-runners when said platen plate is in said second position, the fastener-engaging element of said clamping mechanism being in the form of pliable plastic pads adapted to engage and hold against rotation the head portions of said threaded fasteners, the fastener-engaging elements of said nut-runners being sockets adapted to receive nuts of said threaded fasteners.

* * * * *